United States Patent
Arold

(10) Patent No.: US 6,285,004 B1
(45) Date of Patent: Sep. 4, 2001

(54) HEATING OR AIR-CONDITIONING SYSTEM FOR A PASSENGER CELL OF A MOTOR VEHICLE

(75) Inventor: Klaus Arold, Sindelfingen (DE)

(73) Assignee: DaimlerChrysler AG, Stuttgart (DE)

( * ) Notice: Subject to any disclaimer, the term of this patent is extended or adjusted under 35 U.S.C. 154(b) by 0 days.

(21) Appl. No.: 09/563,528

(22) Filed: May 3, 2000

(30) Foreign Application Priority Data

May 3, 1999 (DE) .............................................. 199 20 061

(51) Int. Cl.[7] ...................................................... B60L 1/02
(52) U.S. Cl. .............................. 219/202; 165/41; 392/485
(58) Field of Search .................................... 219/202, 520, 219/536, 546, 541; 392/485, 496, 350; 165/41, 42; 237/12.3 R, 12.3 A

(56) References Cited

U.S. PATENT DOCUMENTS

| | | | |
|---|---|---|---|
| 5,239,163 | * | 8/1993 | Brouwers ............................. 219/202 |
| 6,124,570 | * | 9/2000 | Ebner et al. .......................... 219/202 |

FOREIGN PATENT DOCUMENTS

| | | |
|---|---|---|
| 37 15 194 | 11/1988 | (DE) . |
| 42 38 364 | 5/1994 | (DE) . |
| 44 33 814 | 3/1996 | (DE) . |
| 2771342 | * 5/1999 | (FR) . |
| 2 336 203 | 10/1999 | (GB) . |
| 56-128214 | * 10/1981 | (JP) . |
| 7-52636 | * 2/1995 | (JP) . |
| 7-89330 | 4/1995 | (JP) . |

* cited by examiner

Primary Examiner—John A. Jeffery
(74) Attorney, Agent, or Firm—Crowell & Moring, LLP

(57) ABSTRACT

A heating or air-conditioning system for a passenger cell of a motor vehicle has a heat exchanger which is arranged in the cooling water circuit of an internal combustion engine and through which an air stream passes. The system also has a supplementary electric heater through which the same air stream flows. The heat exchanger and supplementary electric heater are arranged in an air box, and have an electronic control unit for controlling heating or air conditioning. In order to give the heating or air-conditioning system a design which is economical in terms of installation space and which is easy to mount, the control unit is arranged downstream of the heat exchanger and the supplementary heater in the floor area of the air box. The supplementary heater is oriented at a right angle with respect to the control unit and makes contact with the control unit on its underside.

20 Claims, 1 Drawing Sheet

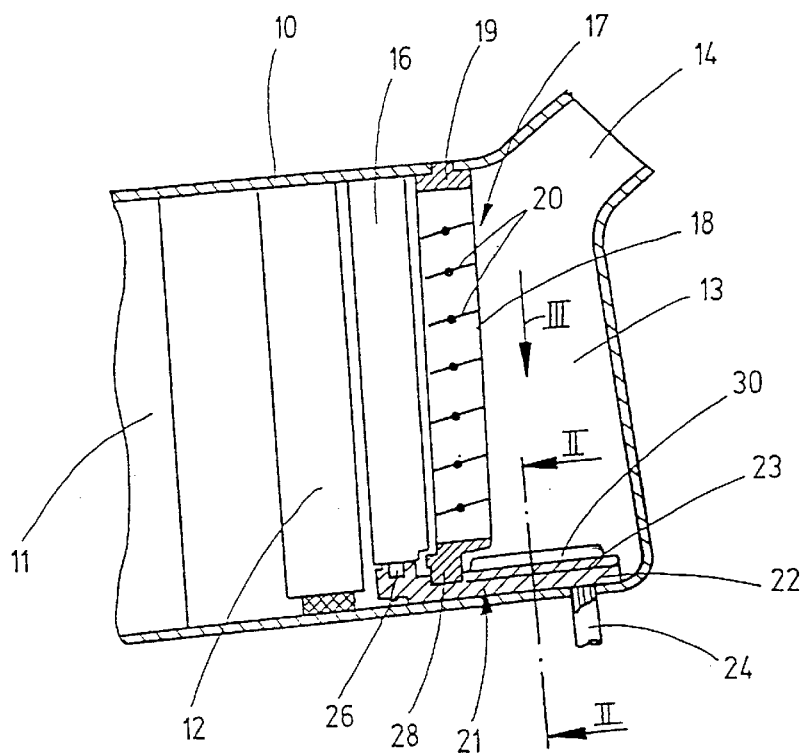
Fig. 1
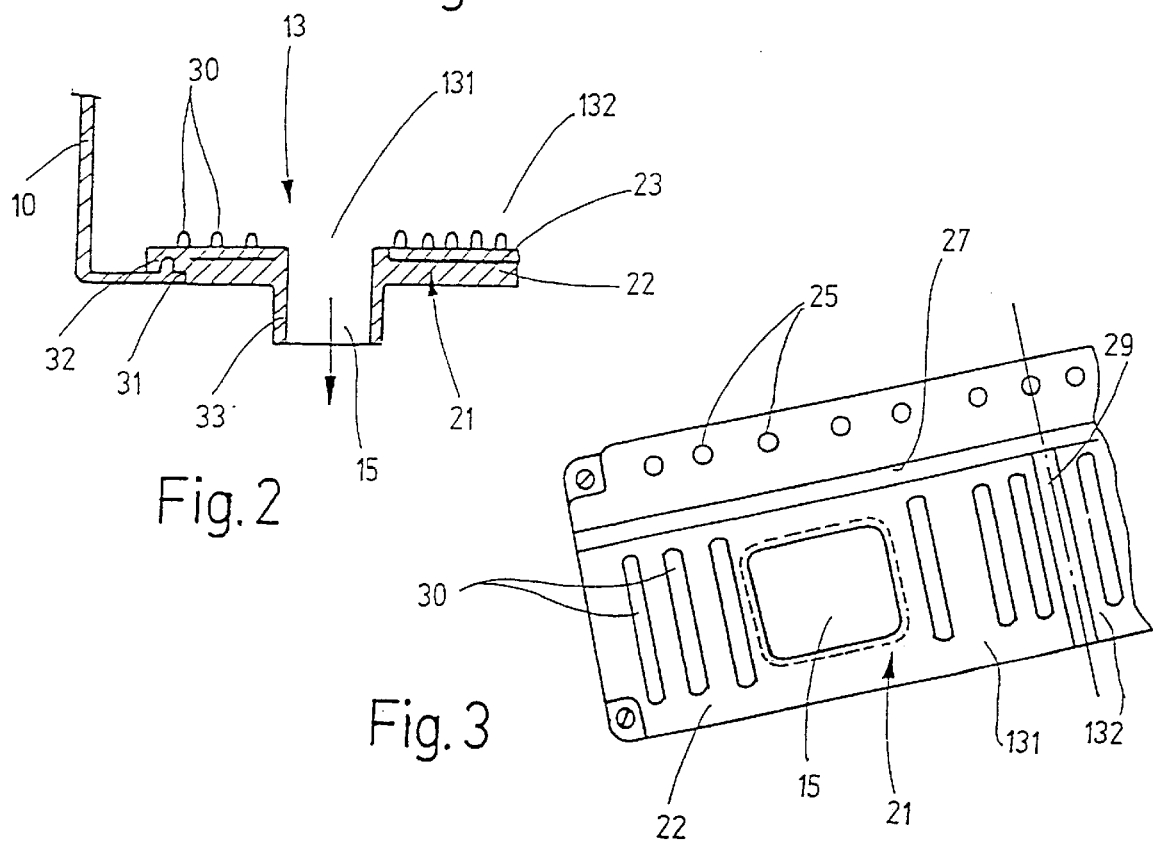
Fig. 2
Fig. 3

HEATING OR AIR-CONDITIONING SYSTEM FOR A PASSENGER CELL OF A MOTOR VEHICLE

This application claims the priority of German application 199 20 061.0, filed May 3, 1999, the disclosure of which is expressly incorporated by reference herein.

BACKGROUND AND SUMMARY OF THE INVENTION

The present invention relates to a heating or air-conditioning system for a passenger cell of a motor vehicle including a heat exchanger through which a heating medium flows and an air stream passes. A supplementary electric heater is arranged downstream of the heat exchanger, and the same air stream passes through the supplementary electric heater. An air box holds the heat exchanger and the supplementary electric heater and serves to guide the air stream, and an electronic control unit controls the heating or air conditioning operation.

In motor vehicles with an internal combustion engine or motor which is designed to have optimized consumption, a significantly lower amount of waste heat is produced. As a result of this, the heat energy made available for heating the passenger cell by cooling the engine becomes too small. This is remedied by providing a supplementary electric heater which, when necessary, heats the air stream flowing through the heat exchanger to a higher temperature.

A heating system of the type mentioned above is known from German publication DE 37 15 194 A1. In this known heating system, the heat exchanger through which cooling water flows is arranged in a duct which carries external air to the passenger cell. In addition, a supplementary electric heater, which ensures that the air is heated during the warming-up phase of the internal combustion engine, is also provided in the duct which carries the external air. In order to heat the air as intensively as possible using the supplementary heater, the latter has a heating conductor with a large area can be regulated to a low temperature of less than 150° C. The supplementary heater is formed so as to have a flat construction in the form of a box which is arranged directly downstream of the heat exchanger in the direction of flow of the air, and is mounted on the heat exchanger. The heat exchanger forms a carrier for the supplementary electric heater.

Another heating system of the type mentioned above is known from German publication DE 42 38 364 A1. In this system, the supplementary electric heater is also arranged downstream of the heat exchanger. As a result, the air stream generated by a blower initially flows through the heat exchanger, is only partially heated, and subsequently flows through the supplementary electric heater and is heated to a higher temperature. The air which is preheated in this way flows into the passenger cell. A passenger-compartment temperature sensor, which is arranged in the passenger cell and which, together with a set-point-value transmitter, determines the heating requirement and is arranged in the air stream flowing into the passenger cell, controls the flow of cooling water through the heat exchanger and the activation period of the supplementary heater using a control unit.

In yet another heating system for motor vehicles which is known from German publication DE 44 33 814 A1, a supplementary electric heater which is present is composed of a multiplicity of so-called PTC (Positive Temperature Coefficient) elements which are heated electrically and through which and around which the air stream which leaves the heat exchanger flows.

The present invention has as an object the provision of a heating or air-conditioning system of the type mentioned above which can be installed in passenger cars, of the compact class, in a way which is extremely economical in terms of installation space, and which is easy to mount.

This object is achieved by arranging the control unit downstream of the heat exchanger and the supplementary electric heater in a floor area of the air box, and by arranging the supplementary electric heater at substantially a right angle with respect to the floor area and so that, on its underside, it makes contact with the control unit.

The heating or air-conditioning system according to the invention has the advantage that the control unit is accommodated in the heating or air-conditioning box in a space-saving fashion. The heating or air-conditioning box can be integrated into the vehicle as a complete functional structural unit; all that is necessary is to connect it to the cooling water circuit of the internal combustion engine of the vehicle. By accommodating the control unit in the floor area, the air-passage cross section in the air-conditioning or heating box is adversely affected only to a slight degree.

Preferred embodiments of the heating or air-conditioning system according to the invention, with advantageous developments and improvements, are claimed.

According to one preferred embodiment of the invention, the control unit is integrated into a flat housing which is fitted on its upper side with electric contact sockets into which electric contact pins which protrude from the underside of the supplementary electric heater can be plugged. The flat housing is mounted here on the floor of the heating or air-conditioning box or forms at least part of the floor of the box. It is also possible to form at least one air outlet duct in the flat housing in order to optimize the compact design of the heating or air-conditioning box.

The invention is described in more detail below with reference to an embodiment illustrated in the drawings, each of the drawing figures providing a schematic representation.

BRIEF DESCRIPTION OF THE DRAWINGS

FIG. 1 shows, in detail, a longitudinal section of an air-conditioning box of an air-conditioning system for a passenger car.

FIG. 2 shows, in detail, a section along line II—II in FIG. 1.

FIG. 3 shows, in detail, a view in the direction of arrow III in FIG. 1 without the supplementary electric heater and without the air-flow-rate control element.

DESCRIPTION OF THE PREFERRED EMBODIMENTS

The air-conditioning system, illustrated schematically in longitudinal section in FIG. 1, has an air box 10, also referred to as air-conditioning box, which is supplied at its input end with air by a blower (not illustrated here). The air box 10 holds a vaporizer 11, which is connected into a coolant circuit, and a heat exchanger 12, which is connected into the cooling water circuit of the internal combustion engine of the passenger car and through which the stream from the blower passes in the aforesaid sequence. Arranged downstream of the heat exchanger 12 is an air distributor 13 from which a plurality of air ducts branches off. The air ducts are connected to air outlet nozzles arranged so as to be distributed in the passenger cell. In FIG. 1, it is only possible to see the air duct 14 which is connected to so-called center nozzles which are integrated in the dashboard in the passenger cell. In FIG. 2, it is also possible to see another air duct 15 which is connected to air outlet nozzles arranged in the footwell of the passenger cell. If there is separate air conditioning of the left-hand and right-hand halves of the passenger cell, that is to say of the driver's side and/or front seat passenger's side, then the air distributor 13 is divided into two air distribution chambers 131 and 132 by a dividing wall running along the longitudinal axis of the air box 10 (FIG. 2). A set of the aforesaid air ducts 14, 15 starts from each air distribution chamber 131 and 132. Either the fresh air which is sucked in by the blower from the surroundings of the vehicle or the mixed air which is sucked in from the passenger cell is cooled in the vaporizer 11 and dehumidified and heated in the heat exchanger 12 through which the hot cooling water of the internal combustion engine flows.

In order to accomplish required heating when the internal combustion engine has not yet heated up and/or in order to meet the maximum heating requirement in motor vehicles with internal combustion engines with optimized consumption, in which the heating requirement can no longer be covered solely by the cooling water circuit of the internal combustion engine, a supplementary electric heater 16 is provided. The supplementary electric heater is arranged directly on the air outlet side of the heat exchanger 12, and air, which leaves the heat exchanger 12, flows through the supplementary electric heater, so that the air is further heated up. Such a supplementary electric heater 16 is usually implemented using PTC elements.

The flow rate of air flowing through the heat exchanger 12 and supplementary electric heater 16 is set by an air-flow-rate control element 17 which, in the exemplary embodiment in FIG. 1, is designed as a blind shutter 18 which is particularly economical in terms of installation space, and is integrated in the air distribution chamber 17. Such a blind shutter 18 has a frame 19 and a multiplicity of closure slats 23 which are arranged equidistantly, one on top of the other, in the frame. The closure slats can pivot together and overlap one another in the closed state of the blind shutter 18. When the aforesaid two air distribution chambers 131, 132 are provided for separate air conditioning of the left-hand and right-hand halves of the passenger cell, each air distribution chamber 131, 132 is assigned a separate blind shutter 18.

In order to control air conditioning, an electronic control unit 21 is arranged, downstream of the heat exchanger 12, the supplementary electric heater 16, and the control element 17, in the floor area of the air distributor 13 in order to maintain the compact design of the air-conditioning system. The electronic control unit 21 is integrated here into a flat housing 22 which is mounted on the floor of the air box 10 in the exemplary embodiment in FIG. 1, and forms part of the floor of the air box 10 itself in the exemplary embodiment in FIGS. 2 and 3. In the simplest case, the flat housing 22 is fabricated by encapsulating, by injection moulding, a printed circuit board 23 which is equipped with electronic modules. The electrical connection to the printed circuit board 23 is made by a cable 24 which emerges from the air box 10 at its floor. The flat housing 22 is fitted with electric contact sockets 25 (FIG. 3) which are accessible from its upper side and are located at the front end of the flat housing 22 in the vicinity of the supplementary electric heater 16. The electric contact sockets are arranged in such a way that plug-in contacts 26 (FIG. 1) which are formed on the underside of the supplementary electric heater 16 can be plugged into the contact sockets 25 when the supplementary electric heater 16 is aligned at a right angle with respect to the flat housing 22. A receptacle 27 extends parallel to the row of contact sockets 25 on the upper side of the flat housing 22. A transverse web 28 (FIG. 1), which is formed on the underside of the frame 19 of the blind shutter 18, is inserted into the receptacle 27 in order to secure the blind shutter 18 to the floor. Furthermore, a groove 29, which extends from the receptacle 27 to that end of the flat housing 22 which faces away from the plug-in sockets 25, is provided in the upper side of the flat housing 22. Specifically, the groove is provided in the plane of symmetry of the flat housing which coincides with the longitudinal axis of the air-conditioning box 10. The dividing wall, which divides the air distributor 13 into the two air distribution chambers 131, 132, is plugged into this groove 29, and is thus secured to the floor. In order to conduct heat away from the electronic components of the control unit 21, cooling ribs 30, which run parallel with respect to one another, run parallel with respect to the longitudinal axis of the air box 10, and extend from near the rear end of the flat housing 22 to near the receptacle 27, protrude from the upper side of the flat housing 22.

In the exemplary embodiment shown in FIGS. 2 and 3, the flat housing 22 forms part of the floor of the air box 10. As is clear from FIG. 2, the floor of the air box 10 has a large recess 31 in the vicinity of the air distributor 13. The flat housing 22 is inserted into the recess 31 in a positively locking fashion and rests with its peripheral flange 221 on the floor of the air box 10. A tongue and groove arrangement 32, which is formed between the floor of the air box housing 10 and the flange 221, ensures that the insertion area of the flat housing 22 is largely air-tight. The flat housing 22 is, as already mentioned, penetrated by the air duct 15, and a connecting element 33, which surrounds the air duct 15 and is intended to have a connecting piece to at least one air outlet nozzle arranged in the footwell of the passenger cell fitted onto it, is formed on the underside of the flat housing 22.

The invention is not restricted to the exemplary embodiment of an air-conditioning system for passenger cars described. In a simplified version, the refrigerating system, including the vaporizer 11 arranged in the air box 10, is eliminated. As a result, the system will then serve merely as a heater. It is then only possible to cool the passenger cell by feeding in fresh air when the heat exchanger 12 is switched off and the supplementary electric heater 16 is not switched on.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

I claim:

1. Heating or air-conditioning system for a passenger cell of a motor vehicle, comprising:

a heat exchanger through which a heating medium flows and through which an air stream passes, a supplementary electric heater which is arranged downstream of the heat exchanger and through which the same air stream passes, an air box which holds the heat exchanger and the supplementary electric heater and serves to guide the air stream, and an electronic control unit which controls heating or air conditioning, wherein the control unit is arranged downstream of the heat exchanger and the supplementary electric heater in a floor area of the air box, and wherein the supplementary electric heater is arranged at substantially a right angle with respect to the floor area and, on its underside, makes contact with the control unit.

2. System according to claim 1, wherein the control unit is integrated into a flat housing which is fitted on its upper side with electric contact sockets into which contact pins, which protrude from the underside of the supplementary electric heater, can be plugged.

3. System according to claim 2, wherein the flat housing is mounted on the floor of the air box.

4. System according to claim 3, and further comprising cooling ribs, which extend parallel with respect to the longitudinal axis of the air box, arranged on the upper side of the flat housing.

5. System according to claim 3, and further comprising at least one air-flow-rate control element which is held by a receptacle formed on the upper side of the flat housing, said air-flow-rate control element controlling passage o f air through the heat exchanger and the supplementary electric heater.

6. System according to claim 3, wherein a groove, which extends in the direction of the longitudinal axis of the air box, is formed on the upper side of the flat housing in order to plug in the lower edge area of a dividing wall which separates, downstream of the supplementary electric heater, two air distribution chambers from one another, said air distribution chambers being formed one next to the other in the air box.

7. System according to claim 6, wherein a separate air-flow-rate control element is arranged in each air distribution chamber.

8. System according to claim 2, wherein the flat housing forms at least part of the floor of the air box.

9. System according to claim 8, wherein the floor of the air box has a recess, and wherein the flat housing is inserted in a positively locking fashion into the recess and is mounted, with a peripheral flange, on the floor of the air box so as to rest on the air box.

10. System according to claim 9, and further comprising a peripheral seal, which is embodied as a tongue and groove arrangement, arranged between the peripheral flange and the floor of the air box.

11. System according to claim 8, wherein at least one air outlet duct leads through the flat housing.

12. System according to claim 8, and further comprising cooling ribs, which extend parallel with respect to the longitudinal axis of the air box, arranged on the upper side of the flat housing.

13. System according to claim 8, and further comprising at least one air-flow-rate control element which is held by a receptacle formed on the upper side of the flat housing, said air-flow-rate control element controlling passage of air through the heat exchanger and the supplementary electric heater.

14. System according to claim 8, wherein a groove, which extends in the direction of the longitudinal axis of the air box, is formed on the upper side of the flat housing in order to plug in the lower edge area of a dividing wall which separates, downstream of the supplementary electric heater, two air distribution chambers from one another, said air distribution chambers being formed one next to the other in the air box.

15. System according to claim 2, and further comprising cooling ribs, which extend parallel with respect to the longitudinal axis of the air box, arranged on the upper side of the flat housing.

16. System according to claim 2, and further comprising at least one air-flow-rate control element which is held by a receptacle formed on the upper side of the flat housing, said air-flow-rate control element controlling passage of air through the heat exchanger and the supplementary electric heater.

17. System according to claim 16, wherein the air-flow-rate control element is a blind shutter having a frame and pivoting slats which are arranged equidistantly one on top of the other in the frame and which can pivot together and overlap one another in the closed state of the blind shutter, and wherein the frame is inserted, with a transverse web formed on the lower frame limb, into the recess in a positively locking fashion.

18. System according to claim 2, wherein a groove, which extends in the direction of the longitudinal axis of the air box, is formed on the upper side of the flat housing in order to plug in the lower edge area of a dividing wall which separates, downstream of the supplementary electric heater, two air distribution chambers from one another, said air distribution chambers being formed one next to the other in the air box.

19. System according to claim 18, wherein a separate air-flow-rate control element is arranged in each air distribution chamber.

20. System according to claim 1, wherein said heating medium is cooling water of an internal combustion engine of the motor vehicle.

\* \* \* \* \*